US011418652B1

(12) United States Patent
Tron et al.

(10) Patent No.: US 11,418,652 B1
(45) Date of Patent: Aug. 16, 2022

(54) COMBINING BEHAVIORAL QUALITY OF SERVICE ASSESSMENT WITH MACHINE LEARNING PREDICTION

(71) Applicant: Intuit Inc., Mountain View, CA (US)

(72) Inventors: Talia Tron, Shefayim (IL); Adi Shalev, Herzlia (IL); Yehezkel Shraga Resheff, Tel Aviv (IL); Elik Sror, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/332,637

(22) Filed: May 27, 2021

(51) Int. Cl.
| | |
|---|---|
| *H04M 3/51* | (2006.01) |
| *H04M 3/523* | (2006.01) |
| *G06F 40/00* | (2020.01) |
| *G06N 20/00* | (2019.01) |
| *G06Q 10/06* | (2012.01) |
| *H04M 3/42* | (2006.01) |

(52) U.S. Cl.
CPC .......... *H04M 3/5233* (2013.01); *G06F 40/00* (2020.01); *G06N 20/00* (2019.01); *G06Q 10/06398* (2013.01); *H04M 3/42221* (2013.01); *H04M 3/5175* (2013.01); *H04M 3/5237* (2013.01); *H04M 2203/401* (2013.01); *H04M 2203/551* (2013.01)

(58) Field of Classification Search
CPC .. G06F 40/00; G06N 20/00; G06Q 10/06398; H04M 3/42221; H04M 3/51; H04M 3/5175; H04M 3/523; H04M 3/5233; H04M 3/5237; H04M 2203/401; H04M 2203/551

USPC .......... 379/265.06, 265.07, 265.12
See application file for complete search history.

(56) References Cited

U.S. PATENT DOCUMENTS

| | | | | |
|---|---|---|---|---|
| 10,264,128 | B1* | 4/2019 | Siddiqui | ............... G06N 5/022 |
| 10,965,812 | B1* | 3/2021 | Das | ..................... G06F 40/284 |
| 2016/0371703 | A1* | 12/2016 | Mon | ..................... H04L 67/306 |
| 2021/0117902 | A1* | 4/2021 | Veloso | ............ G06Q 10/06312 |
| 2021/0158805 | A1* | 5/2021 | Sivasubramanian | ... G06F 16/61 |
| 2021/0319361 | A1* | 10/2021 | Miyajima | ........... G06F 16/2379 |

* cited by examiner

*Primary Examiner* — Harry S Hong
(74) *Attorney, Agent, or Firm* — Paradice and Li LLP

(57) ABSTRACT

Systems and methods for automatically assessing a quality of service for agents of a customer support system are disclosed. An example method may include retrieving historical conversations between the agents and users of the customer support system, receiving user comments for one or more of the historical conversations, identifying which of the received user comments includes keywords indicative of one or more quality of service attributes, generating transcripts of historical conversations associated with the identified user comments, training a machine learning model based at least in part on the generated transcripts and the user comments of the historical conversations associated with the identified user comments, providing a plurality of current conversations between agents and users of the customer support system to the trained machine learning model, and generating a behavioral score for each of the agents using the trained machine learning model.

20 Claims, 4 Drawing Sheets

COMBINING BEHAVIORAL QUALITY OF SERVICE ASSESSMENT WITH MACHINE LEARNING PREDICTION

TECHNICAL FIELD

This disclosure relates generally to methods for behavioral quality of service (QoS) assessment, and specifically to incorporating machine learning into such behavioral QoS assessment.

DESCRIPTION OF RELATED ART

Increasingly, companies and institutions have provided support systems that allow customers to request assistance with a product or service provided by the company or institution. Upon accessing the support system, the customer may be connected with a customer support agent via telephone, instant message (chat), Voice over Internet Protocol (VoIP), or some other suitable communication medium.

A customer may be connected with one of many different customer support agents when requesting assistance from the support system, and differences between customer support agents may cause customers to have different satisfaction levels with interactions via the support system. Thus, in an effort to maximize customer satisfaction, many companies and institutions deploy managers to supervise and evaluate customer support agents based on various information, such as customer feedback or a transcript of an interaction.

For example, after a customer completes interacting with a customer support agent, a customer may provide one or more free-form text comments or scores (e.g., 0-10) indicative of the customer's satisfaction with the interaction, the agent associated with the interaction, or both. Since a relatively small percentage of customers actually provide such feedback, and because free-form text comments and transcripts are generally unstructured and vary greatly in terminology, managers may have difficulty generating meaningful customer support agent evaluations based on the customer feedback and transcripts. As a result, managers may be unable to effectively manage their teams, such as by retaining high-quality customer support agents and/or coaching underperforming customer support agents, which ultimately decreases customer satisfaction.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for automatically assessing a quality of service for agents of a customer support system. An example method may include retrieving historical conversations between the agents and users of the customer support system, receiving user comments for one or more of the historical conversations, identifying which of the received user comments includes keywords indicative of one or more quality of service attributes, generating transcripts of historical conversations associated with the identified user comments, training a machine learning model based at least in part on the generated transcripts and the user comments of the historical conversations associated with the identified user comments, providing a plurality of current conversations between agents and users of the customer support system to the trained machine learning model, and generating a behavioral score for each of the agents using the trained machine learning model.

In some aspects, the quality of service attributes include one or more of a positive professionalism attribute, a negative professionalism attribute, a positive empathy attribute, a negative empathy attribute, a positive communication attribute, or a negative communication attribute. In some aspects, the user comments are received as free-form text.

In some aspects, one or more of the keywords "walked me through," "navigated me," "made sure I was successful," "helped me understand," "efficiently," "was professional," "was polite," "accommodated," "insight," "was competent," "expert," "was experienced," "timely," "results," "was responsive," or "was knowledgeable," is indicative of a positive professionalism attribute, and one or more of the keywords "was not helpful," "unhelpful," "gave up," "got upset," "rude," "could not explain," "was slow," "could not solve," "was unprofessional," "was impolite," "did not accommodate," "was incompetent," or "was inexperienced," is indicative of a negative professionalism attribute.

In some aspects, one or more of the keywords "was respectful," "was patient," "was genuine," "was caring," "took the time," "paid attention," "asked me," "was willing," "acknowledged," "was attentive," "was generous," "was thoughtful," "listened," "understood," "was pleasant," "was friendly," or "was good natured" is indicative of a positive empathy attribute, and one or more of the keywords "was disrespectful," "was impatient," "was insincere," "did not care," "did not take the time," "ignored," "was not willing," "dismissed," "was inattentive," "did not listen," "did not understand," "was unpleasant," or "was unfriendly," is indicative of a negative empathy attribute.

In some aspects, one or more of the keywords "was easy to follow," "clearly stated," "made sense," "explained," "helped me understand," "directed me," "guided me," "spoke clearly," "pointed me," "clarified," or "answered," is indicative of a positive communication attribute, and one or more of the keywords "was confusing," "could not follow," "was not clear," "was unclear," "did not make sense," "failed to explain," "could not explain," or "did not answer," is indicative of a negative communication attribute.

In some aspects, the machine learning model is configured to generate the behavioral score based on metadata associated with the plurality of current conversations. In some aspects, the metadata indicates at least one of a number of sentences said by a respective user, a number of sentences said by a respective agent, a number of words said by the respective user, a number of words said by the respective agent, a number of times the respective agent placed the respective user on hold, a total amount of time that the respective user was on hold, a total amount of time that the respective agent was speaking, a total amount of time that the respective user was speaking, a total amount of time that the respective agent was not speaking, a total amount of time that the respective user was not speaking, a number of times that the respective user and the respective agent were speaking simultaneously, or a total amount of time that the respective user and the respective agent were speaking simultaneously.

In some aspects, the method may further include extracting the keywords from the user comments using one of a natural-language programming (NLP) algorithm or a key-phrase extractor. In some aspects, the method may further include providing the behavioral score to at least one of a respective agent or a supervisor of the respective agent.

Another innovative aspect of the subject matter described in this disclosure can be implemented in a system for automatically assessing a quality of service for agents of a customer support system. An example system may include one or more processors and a memory storing instructions for execution by the one or more processors. Execution of the instructions may cause the system to retrieve historical conversations between the agents and users of the customer support system, receive user comments for one or more of the historical conversations, identify which of the received user comments includes keywords indicative of one or more quality of service attributes, generate transcripts of historical conversations associated with the identified user comments, train a machine learning model based at least in part on the generated transcripts and the user comments of the historical conversations associated with the identified user comments, provide a plurality of current conversations between agents and users of the customer support system to the trained machine learning model, and generate a behavioral score for each of the agents using the trained machine learning model.

In some aspects, the quality of service attributes include one or more of a positive professionalism attribute, a negative professionalism attribute, a positive empathy attribute, a negative empathy attribute, a positive communication attribute, or a negative communication attribute. In some aspects, the user comments are received as free-form text.

In some aspects, one or more of the keywords "walked me through," "navigated me," "made sure I was successful," "helped me understand," "efficiently," "was professional," "was polite," "accommodated," "insight," "was competent," "expert," "was experienced," "timely," "results," "was responsive," or "was knowledgeable," is indicative of a positive professionalism attribute, and one or more of the keywords "was not helpful," "unhelpful," "gave up," "got upset," "rude," "could not explain," "was slow," "could not solve," "was unprofessional," "was impolite," "did not accommodate," "was incompetent," or "was inexperienced," is indicative of a negative professionalism attribute.

In some aspects, one or more of the keywords "was respectful," "was patient," "was genuine," "was caring," "took the time," "paid attention," "asked me," "was willing," "acknowledged," "was attentive," "was generous," "was thoughtful," "listened," "understood," "was pleasant," "was friendly," or "was good natured" is indicative of a positive empathy attribute, and one or more of the keywords "was disrespectful," "was impatient," "was insincere," "did not care," "did not take the time," "ignored," "was not willing," "dismissed," "was inattentive," "did not listen," "did not understand," "was unpleasant," or "was unfriendly," is indicative of a negative empathy attribute.

In some aspects, one or more of the keywords "was easy to follow," "clearly stated," "made sense," "explained," "helped me understand," "directed me," "guided me," "spoke clearly," "pointed me," "clarified," or "answered," is indicative of a positive communication attribute, and one or more of the keywords "was confusing," "could not follow," "was not clear," "was unclear," "did not make sense," "failed to explain," "could not explain," or "did not answer," is indicative of a negative communication attribute.

In some aspects, the machine learning model is configured to generate the behavioral score based on metadata associated with the plurality of current conversations. In some aspects, the metadata indicates at least one of a number of sentences said by a respective user, a number of sentences said by a respective agent, a number of words said by the respective user, a number of words said by the respective agent, a number of times the respective agent placed the respective user on hold, a total amount of time that the respective user was on hold, a total amount of time that the respective agent was speaking, a total amount of time that the respective user was speaking, a total amount of time that the respective agent was not speaking, a total amount of time that the respective user was not speaking, a number of times that the respective user and the respective agent were speaking simultaneously, or a total amount of time that the respective user and the respective agent were speaking simultaneously.

In some aspects, execution of the instructions may further cause the system to extract the keywords from the user comments using one of a natural-language programming (NLP) algorithm or a key-phrase extractor. In some aspects, execution of the instructions may further cause the system to provide the behavioral score to at least one of a respective agent or a supervisor of the respective agent.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Figure 1:
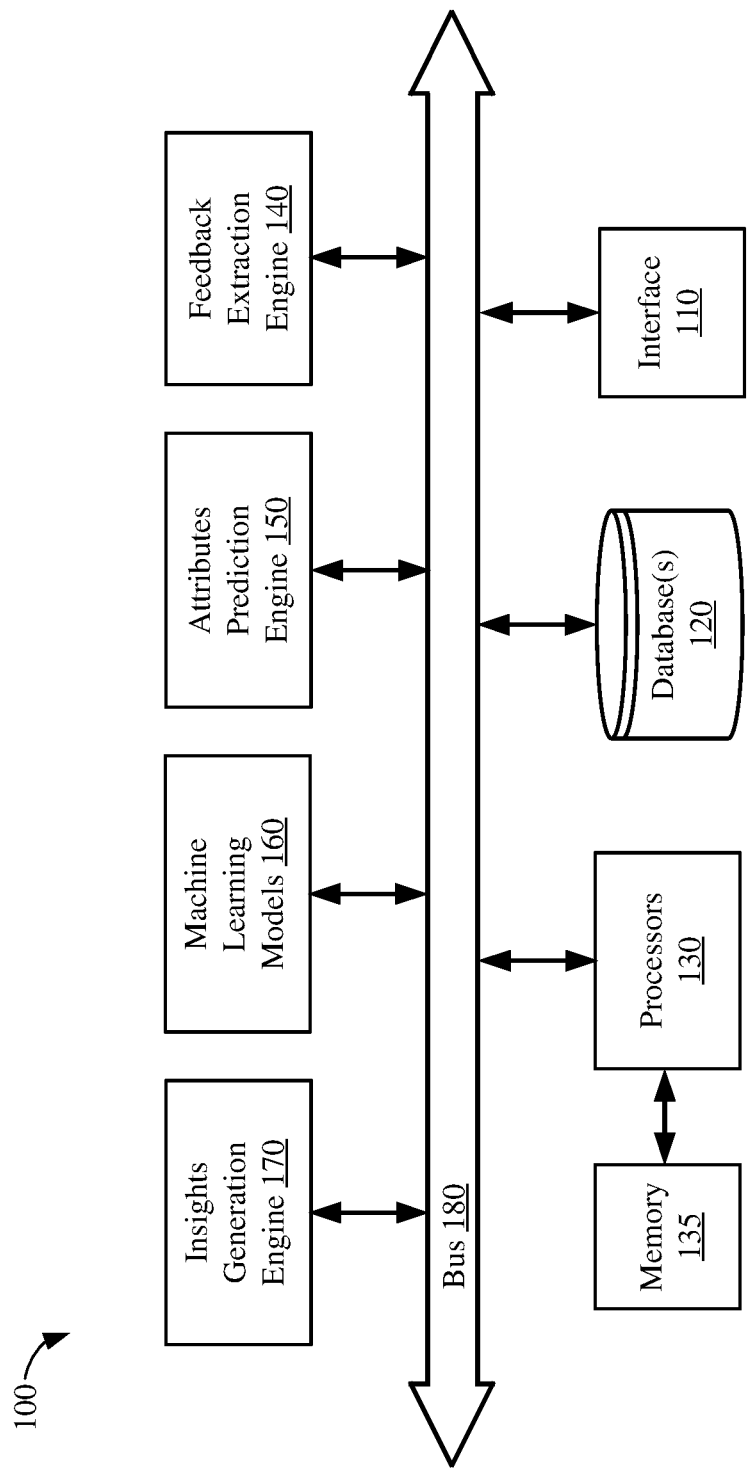
FIG. 1 shows a machine learning (ML) augmented customer support system, according to some implementations.

Implementations of the subject matter described in this disclosure may be used to automatically assess a quality of service for agents of a customer support system. As described above, customers (or "users") often experience inconsistent results when requesting assistance from conventional customer support systems. For example, individual customer support agents may vary in competency, temperament, and clarity—among other behavioral qualities—which may result in the system providing an inconsistent customer experience. Furthermore, due to the unstructured nature of customer feedback and transcripts, managers may have difficulty generating meaningful evaluations for agents, and thus, may be unable to properly manage their teams. As noted above, a customer may be connected with a customer support agent via telephone, instant message (chat), VoIP, or some other suitable communication medium. For simplicity, a customer support agent may be referred to herein as an "agent," and a connection and interaction between a customer and an agent may be referred to herein as a "call," regardless of the communication medium used to establish the connection.

Aspects of the present disclosure address these concerns by combining behavioral quality-of-service (QoS) assessment with machine-learning (ML) prediction in a customer support system. In some implementations, the customer support system is trained to automatically generate labels from historical customer feedback and historical call transcripts, and to use the labels to train one or more ML models to generate predictive behavioral QoS scores for agents based on current customer feedback and current transcripts, in real-time. In some implementations, the customer support system generates the predictions (or "inferences") further based on metadata related to historical conversations, current conversations, users, and/or agents, as further described below.

For purposes of discussion herein, a behavioral QoS attribute may be a perceived behavioral characteristic or quality of a respective customer support agent based on customer sentiment. For simplicity, a behavioral QoS attribute may be referred to herein as an "attribute," a "behavioral attribute," a "QoS attribute," an "agent attribute," an "agent characteristic," or the like. For purposes of discussion herein, a behavioral QoS assessment may be an automatically generated evaluation of a respective customer support agent's behavioral QoS attributes based on data related to the agent's customer interactions. For simplicity, the process of generating a behavioral QoS assessment may be referred to herein as an "assessment," a "behavioral assessment," a "QoS assessment," an "agent assessment," or the like, and the generated behavioral QoS assessment may also be referred to herein as an "assessment," a "behavioral assessment," a "QoS assessment," an "agent assessment," or the like, as well as a "behavioral QoS report," a "behavioral report," a "QoS report," or the like. For purposes of discussion herein, a behavioral QoS score may be an automatically generated quantitative value indicative of a quality of one or more behavioral QoS attributes for one or more respective customer support agents. For simplicity, a behavioral QoS score may be referred to herein as a "score," a "behavioral score," a "QoS score," an "agent score," or the like.

Various implementations of the subject matter disclosed herein provide one or more technical solutions to the technical problem of expanding the functionality of customer support systems by incorporating ML predictions. More specifically, various aspects of the present disclosure provide a unique computing solution to a unique computing problem that did not exist prior to electronic or online customer support systems that can assess behavioral QoS attributes of agents based on ML predictions. As such, implementations of the subject matter disclosed herein are not an abstract idea such as organizing human activity or a mental process that can be performed in the human mind.

Moreover, various aspects of the present disclosure effect an improvement in the technical field of ML to expand the functionality of customer support systems by incorporating ML predictions. The use of one or multiple ML models for predicting behavioral QoS scores for agents cannot be performed in the human mind, much less using pen and paper. By automatically enabling ML augmented monitoring, evaluation, and assessment of behavioral QoS attributes for agents of a customer support system to indicate various behavioral QoS attributes provided by each agent, the subject matter disclosed herein provides meaningful improvements to the performance of customer support systems. As such, implementations of the subject matter disclosed herein are not an abstract idea such as organizing human activity or a mental process that can be performed in the human mind.

FIG. 1 shows a ML augmented customer support system 100, according to some implementations. Various aspects of the ML augmented customer support system 100 disclosed herein may be applicable for assessing behavioral QoS attributes for agents of the ML augmented customer support system 100. Specifically, by training one or more ML models using manually and/or automatically generated labels for historical data related to interactions between agents and users (or "customers"), aspects of the present disclosure may use the trained ML models to generate predictive behavioral QoS scores indicative of various behavioral QoS attributes for agents based on data related to current interactions between agents and users. Such functionality may be useful for assessing quantitative behavioral QoS attributes for agents in real-time, monitoring various key performance indicators (KPIs) for agents over time, improving customer satisfaction, providing agents with personalized feedback and coaching, reducing managerial costs, identifying and addressing customer support areas for improvement, informing managerial decisions, performing tasks related to business, finance, and/or taxes, managing human resources, delegating performance-based rewards, recruiting and retaining high-quality customer support agents, and a variety of other subject areas.

The ML augmented customer support system 100 is shown to include an input/output (I/O) interface 110, a database 120, one or more data processors 130, a memory 135 coupled to the data processors 130, a feedback extraction engine 140, an attributes prediction engine 150, one or more machine learning models (referred to herein as machine learning models 160), and an insights generation engine 170. In some implementations, the various components of the ML augmented customer support system 100 may be interconnected by at least a data bus 180, as depicted in the example of FIG. 1. In other implementations, the various components of the ML augmented customer support system 100 may be interconnected using other suitable signal routing resources.

The interface 110 may include a screen, an input device, or other suitable elements that allow a user to provide information to the ML augmented customer support system 100 and/or to retrieve information from the ML augmented customer support system 100. Example information that can be provided to the ML augmented customer support system 100 may include one or more sets of training data for training the machine learning models 160. Additionally or alternatively, the example information may include values associated with a previous version of one or more of the feedback extraction engine 140, the attributes prediction engine 150, or the insights generation engine 170. Example values may include conversation transcripts, user comments, keywords, and/or metadata. Example information that can be retrieved from the ML augmented customer support system 100 may include outputs of one or more of the feedback extraction engine 140, the attributes prediction engine 150, the machine learning models 160, or the insights generation engine 170, such as agent behavioral QoS reports (or "assessments"), agent behavioral QoS scores, or other ML predictive values.

The database 120, which may represent any suitable number of databases, may store any suitable information pertaining to sources of current training data, historical training data, a list of specific keywords (e.g., a dictionary of terms), a list of similar keywords (e.g., a lexicon or thesaurus), feedback and tuning parameters used to train the machine learning models 160, and the like. For example, the database 120 may store historical behavioral QoS scores, current behavioral QoS scores, audio and/or text-based transcripts, user comments, conversation metadata or other indicators generated by the system 100, agent profiles, user information, and so on. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the ML augmented customer support system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The feedback extraction engine 140 may be used to retrieve historical conversations between agents and users of the ML augmented customer support system 100, such as from the database 120. A historical conversation may be an audio recording of a call between an agent and a user, or an automatically generated text transcript of the call. The feedback extraction engine 140 may further receive user comments for one or more of the historical conversations, such as from the database 120 or via the interface 110. As noted above, example user comments may include free-form text comments provided by the user as feedback after completing a call with an agent. The user comments may be text input into a questionnaire, audio feedback provided by a user, or a transcript of audio feedback provided by the user via a speech-to-text application. The feedback extraction engine 140 may use a natural-language programming (NLP) algorithm or a rule-based, key-phrase extractor to identify one or more keywords in the user comments, such as keywords indicative of a user sentiment about the agent's behavior. In some implementations, if the historical conversations associated with the user comments are in an audio format, the feedback extraction engine 140 may generate a text transcript for each of the associated audio files prior to the identifying.

In some implementations, the identified keywords may be indicative of one or more behavioral QoS attributes of an agent, such as one or more of a positive professionalism attribute, a negative professionalism attribute, a positive empathy attribute, a negative empathy attribute, a positive communication attribute, or a negative communication attribute. A positive professionalism attribute may be an indication of a user's satisfaction with the agent's competency during an associated call. For example, a keyword "was competent" in the user comments may be associated with a positive professionalism attribute. A negative professionalism attribute may be an indication of a user's dissatisfaction with an agent's competency during an associated call. For example, a keyword "was incompetent" in the user comments may be associated with a negative professionalism attribute. A positive empathy attribute may be an indication of a user's satisfaction with an agent's temperament during an associated call. For example, a keyword "was respectful" in the user comments may be associated with a positive empathy attribute. A negative empathy attribute may be an indication of a user's dissatisfaction with an agent's temperament during an associated call. For example, a keyword "did not listen" in the user comments may be associated with a negative empathy attribute. A positive communication attribute may be an indication of a user's satisfaction with an agent's clarity during an associated call. For example, a keyword "spoke clearly" in the user comments may be associated with a positive communication attribute. A negative communication attribute may be an indication of a user's dissatisfaction with an agent's clarity during an associated call. For example, a keyword "could not follow" in the user comments may be associated with a negative communication attribute.

In some implementations, the feedback extraction engine 140 may identify the keywords based on a predefined list of keywords, such as a list of specific keywords (e.g., a dictionary of terms) or a list of similar keywords (e.g., a lexicon or a thesaurus for the terms in the dictionary). As a non-limiting example, a predefined list of keywords indicative of a positive professionalism attribute may include "walked me through," "navigated me," "made sure I was successful," "helped me understand," "efficiently," "was professional," "was polite," "accommodated," "insight," "was competent," "expert," "was experienced," "timely," "results," "was responsive," or "was knowledgeable," a predefined list of keywords indicative of a negative professionalism attribute may include "was not helpful," "unhelpful," "gave up," "got upset," "rude," "could not explain," "was slow," "could not solve," "was unprofessional," "was impolite," "did not accommodate," "was incompetent," or "was inexperienced," a predefined list of keywords indicative of a positive empathy attribute may include "was respectful," "was patient," "was genuine," "was caring," "took the time," "paid attention," "asked me," "was willing," "acknowledged," "was attentive," "was generous," "was thoughtful," "listened," "understood," "was pleasant," "was friendly," or "was good natured, a predefined list of keywords indicative of a negative empathy attribute may include "was disrespectful," "was impatient," "was insincere," "did not care," "did not take the time," "ignored," "was not willing," "dismissed," "was inattentive," "did not listen," "did not understand," "was unpleasant," or "was unfriendly," a predefined list of keywords indicative of a positive communication attribute may include "was easy to follow," "clearly stated," "made sense," "explained," "helped me understand," "directed me," "guided me," "spoke clearly," "pointed me," "clarified," or "answered,"

and a predefined list of keywords indicative of a negative communication attribute may include "was confusing," "could not follow," "was not clear," "was unclear," "did not make sense," "failed to explain," "could not explain," or "did not answer."

The feedback extraction engine 140 may use the NLP algorithm or the rule-based, key-phrase extractor to extract the identified keywords from the user comments and associated historical conversations, and use the identified keywords as input for training the machine learning models 160, as described below. In some implementations, the feedback extraction engine 140 may generate a list of key-value pairs based on the extracted keywords, where each pair is associated with a specific keyword. For example, each key-value pair may indicate a particular term or phrase associated with a user's opinion of the professionalism, empathy, or communication ability of an agent, and an associated quantitative value representing (or contributing to) an assessment of the agent's professionalism, empathy, or communication ability, respectively. For instance, the phrase "paid attention" may be paired with an indication of a "positive empathy" attribute, and the term "ignored" may be paired with an indication of a "negative empathy" attribute, as further described below. In some implementations, the list of key-value pairs may be in a JSON (JavaScript Object Notation) format, an Extensible Markup Language (XML) format, or another suitable file format.

In some implementations, the feedback extraction engine 140 may generate a file for each historical conversation associated with one or more of the identified keywords. The file may be in a JSON format, an XML format, or another suitable file format. In some implementations, the file may include a plurality of labels, each label associated with an identified keyword in the associated historical conversation. For purposes of discussion herein, a file for a respective historical conversation may be referred to as a "labeled transcript" of the respective historical conversation. In some implementations, the labeled transcript may indicate various statistical values related to each of the included labels, such as statistical values associated with metadata related to the respective historical conversation, user comments associated with the respective historical conversation, or the like. For example, a labeled transcript may indicate a number of times that a specific keyword in the dictionary (e.g., "rude") appears in the respective historical conversation, a number of times any of a group of keywords in the lexicon (e.g., "rude," "curt," "vulgar," "rough," "disrespectful") appears in the respective historical conversation, or the like. The labeled transcript and associated values may be used as input for training the machine learning models 160, as further described below.

The feedback extraction engine 140 may also retrieve metadata related to historical conversations associated with the user comments and/or historical conversations. In some implementations, the feedback extraction engine 140 may retrieve the metadata from a database (e.g., the database 120) and/or via an interactive voice response (IVR) system. In some other implementations, the feedback extraction engine 140 may retrieve the metadata based on a NLP algorithm, one or more defined rules, or other suitable means. In some implementations, one or more portions of the metadata may be indicated in a text (or other suitably formatted) file generated from free-form text transcripts or user comments based on a speech-to-text operation, and a NLP may process the file to identify the metadata based on indicators (e.g., commas) included in the file. In some implementations, the file may include time markers (e.g., such as based on microphone input data) indicating times during a conversation when a customer or agent started or stopped speaking or when the customer and agent were speaking at the same time. In these manners, the metadata may indicate various statistics related to a particular historical conversation, such as a number of sentences said by a respective user during the particular historical conversation, a number of sentences said by a respective agent, a number of words said by the respective user, a number of words said by the respective agent, a number of times the respective agent placed the respective user on hold, a total amount of time that the respective user was on hold, a total amount of time that the respective agent was speaking, a total amount of time that the respective user was speaking, a total amount of time that the respective agent was not speaking, a total amount of time that the respective user was not speaking, a number of times that the respective user and the respective agent were speaking simultaneously, or a total amount of time that the respective user and the respective agent were speaking simultaneously. While the above metadata examples are with reference to a spoken conversation, the metadata examples may be with reference to a messaging conversation or other communication medium. For example, the metadata may indicate one or more of a number of sentences typed by a respective user, a number of sentences typed by a respective agent, and so on. In some implementations, the feedback extraction engine 140 may indicate the metadata retrieved for a respective historical conversation in a labeled transcript associated with the respective historical conversation. In some other implementations, the feedback extraction engine 140 may indicate the metadata in a different appropriate file format.

For purposes of training the machine learning models 160, the attributes prediction engine 150 may indicate a weight for (or otherwise indicate an importance of) individual keywords in the labeled transcripts or particular statistics indicated by the metadata. For instance, one of the machine learning models 160 may be a ML model for generating an empathy behavioral score, and the attributes prediction engine 150 may train said ML model to assign a higher weight to a keyword more likely to be indicative of a positive empathy attribute (e.g., "was genuine") and a lower weight to a keyword less likely to be indicative of a positive empathy attribute (e.g., "asked me"). As another example, one of the machine learning models 160 may be a ML model for generating a professionalism behavioral score, and the attributes prediction engine 150 may train said ML model to assign a higher weight to a metadata statistic more likely to be indicative of a negative professionalism attribute and a lower weight to a metadata statistic less likely to be indicative of a negative professionalism attribute (e.g., a total amount of time that the user was speaking).

In some implementations, the attributes prediction engine 150 may indicate a desired set of behavioral QoS scores that is to be generated by the trained machine learning models 160 based on a particular labeled transcript, user comments, or metadata associated with a historical conversation. In some aspects, the key-value pairs described above may be used as input for the machine learning models 160 to indicate desired output QoS scores based on particular terms or phrases in the historical conversations, user comments, and/or metadata. In some implementations, the machine learning models 160 may be automatically trained using unlabeled historical conversations, user comments, or metadata. For example, the attributes prediction engine 150 may indicate that the trained machine learning models 160 are to output an indication of a "positive empathy attribute" for a respective agent based on identifying a particular keyword (e.g., "listened") in a set of user comments associated with the respective agent, as further described below. In some implementations, the machine learning models 160 may be manually and/or automatically trained until an error between a desired output and an actual output is below a value. In this manner, the machine learning models 160 may be trained to generate predictive labels (e.g., desired behavioral QoS scores) for unlabeled transcripts associated with current conversations, current user comments, and/or current metadata, with or without human supervision.

In some aspects, a supervisor may determine that particular metadata (e.g., a number of times an agent places a customer on hold being above a value) is indicative of a particular behavioral attribute for an agent (e.g., a negative professionalism attribute) and use the particular metadata as input to train the machine learning models 160 to generate a desired output (e.g., a negative professionalism attribute) based on similar, current metadata. In some implementations, if the user comments are in free-form text format, an associated key-value pair list may indicate one or more keywords (e.g., "polite") indicative of a positive attribute (e.g., a positive professionalism attribute) in the user comments and one or more keywords (e.g., "rude") indicative of a negative attribute (e.g., a negative professionalism attribute) in the user comments, as further described below. In some implementations, other statistics or values related to the user comments and/or metadata may be used to indicate a desired output for a particular behavioral attribute.

In some implementations, the machine learning models 160 may include one or more machine learning models based on, for example, one or more decision trees, random forests, logistic regression, nearest neighbors, classification trees, control flow graphs, support vector machines, naïve Bayes, Bayesian Networks, value sets, hidden Markov models, or neural networks configured to generate predictions for the intended purpose. In some implementations, the machine learning models 160 include a neural network of any suitable type, such as a feedforward neural network or a recurrent neural network. For example, the machine learning models 160 may include a deep neural network (DNN), which may have any suitable architecture, such as a feedforward architecture or a recurrent architecture.

Once trained, the machine learning models 160 may receive unlabeled transcripts associated with current conversations between agents and users of the ML augmented customer support system 100, and predict one or more labels for the unlabeled transcripts, each of the labels indicative of a "positive" or a "negative" behavioral QoS attribute of the agent. In some implementations, each unlabeled transcript may include a transcript of a current (or recent) conversation between an agent and a user of the ML augmented customer support system 100. In some other implementations, the unlabeled transcripts may also include information related to metadata and/or user comments associated with the current conversation. The machine learning models 160 may output the predictive behavioral QoS scores for each agent associated with the unlabeled transcripts. In some implementations, the attributes prediction engine 150 in conjunction with the machine learning models 160 may output the one or more behavioral QoS scores to the interface 110, which may display the behavioral QoS scores to at least one of a respective agent or a supervisor of the respective agent. Additionally or alternatively, the attributes prediction engine 150 in conjunction with the machine learning models 160 may output the behavioral QoS scores to the insights generation engine 170 for further processing.

The machine learning models 160 may include a plurality of ML models, each ML model trained to generate a prediction (e.g., a "positive" label or a "negative" label) associated with a particular behavioral attribute of an agent based on an unlabeled transcript associated with the agent. In some aspects, a "positive" label may be indicative of a customer having a positive experience with the agent with respect to the particular behavioral attribute, and a "negative" label may be indicative of the customer having a negative experience with the agent with respect to the particular behavioral attribute. As a non-limiting example, an empathy specific model of the machine learning models 160 may be trained to generate a "positive" label (e.g., 1) or a "negative" label (e.g., 0) for an empathy behavioral attribute of the agent based on a particular unlabeled transcript, a communication specific model of the machine learning models 160 may be trained to generate a "positive" or a "negative" label for a communication behavioral attribute of the agent based on the unlabeled transcript, and a professionalism specific model of the machine learning models 160 may be trained to generate a "positive" or a "negative" label for a professionalism behavioral attribute of the agent based on the unlabeled transcript. In this manner, a single unlabeled transcript associated with an agent may be input to the machine learning models 160, and each model of the machine learning models 160 may generate a prediction associated with a different behavioral attribute of the agent. In some implementations, each respective model of the machine learning models 160 may also be trained to output a confidence level (e.g., a value between 0 and 1) indicative of a degree of certainty that the respective model has in the generated prediction. In some aspects, the confidence level may be output or otherwise interpreted as a behavioral QoS score for the attribute associated with the prediction, as further described below.

In some other implementations, the machine learning models 160 may include a single ML model trained to generate a cumulative behavioral QoS score indicative of a general behavioral QoS attribute of an agent based on a combination of several behavioral QoS score calculations. In some aspects, the single behavioral QoS score may be a vector of values, each value being an individual behavioral QoS score calculation for a different behavioral QoS attribute.

In some implementations, the insights generation engine 170 may generate one or more behavioral QoS reports (or "assessments") for agents indicating the multiple behavioral QoS scores and/or the cumulative behavioral QoS score described above. In some implementations, the insights generation engine 170 may provide suggested actionable behaviors for an agent based on the one or more QoS scores. For example, the insights generation engine 170 may provide a suggestion that an agent receive additional training if the agent receives a relatively low professionalism QoS score, such as if the agent's professionalism QoS score is lower than an average professionalism QoS score for the agent over time or is lower than an average professionalism QoS score for all agents. As another example, the insights generation engine 170 may provide a suggestion that an agent receive additional training if the agent's professionalism QoS score is lower than a median professionalism QoS score or is lower than a set value.

In some implementations, the insights generation engine 170 may output the one or more behavioral QoS reports to the interface 110, which may display the behavioral QoS reports to at least one of a respective agent or a supervisor of the respective agent. For example, the insights generation engine 170 may generate a behavioral QoS report indicating that a particular agent has a relatively low communication skill (e.g., in the bottom 10% of all agents) and including an example audio recording of a call for which the agent received a relatively low communication QoS score. In some aspects, the insights generation engine 170 may embed a copy of (or include a hyperlink to) the example audio recording such that the agent, the agent's supervisor, or both, may directly access the example audio recording from the interface 110. In some implementations, the insights generation engine 170 may generate an email to the agent, the agent's supervisor, or both, including an attachment of a behavioral QoS report for the agent. In some other implementations, the insights generation engine 170 may provide the agent, the agent's supervisor, or both, access to a portal in which the behavioral QoS report may be viewed and/or retrieved. In some instances, the insights generation engine 170 may periodically email agents, supervisors, or both, lists of behavioral QoS scores and/or various statistics associated with the behavioral QoS scores.

The particular architecture of the ML augmented customer support system 100 shown in FIG. 1 is but one example of a variety of different architectures within which aspects of the present disclosure may be implemented. For example, in other implementations, the ML augmented customer support system 100 may not include the feedback extraction engine 140, the functions of which may be implemented by the processors 130 executing corresponding instructions or scripts stored in the memory 135. In some other implementations, the functions of the attributes prediction engine 150 may be performed by the processors 130 executing corresponding instructions or scripts stored in the memory 135. Similarly, the functions of the machine learning models 160 may be performed by the processors 130 executing corresponding instructions or scripts stored in the memory 135. In some implementations, the functions of the insights generation engine 170 may be performed by the processors 130 executing corresponding instructions or scripts stored in the memory 135.

Figure 2:
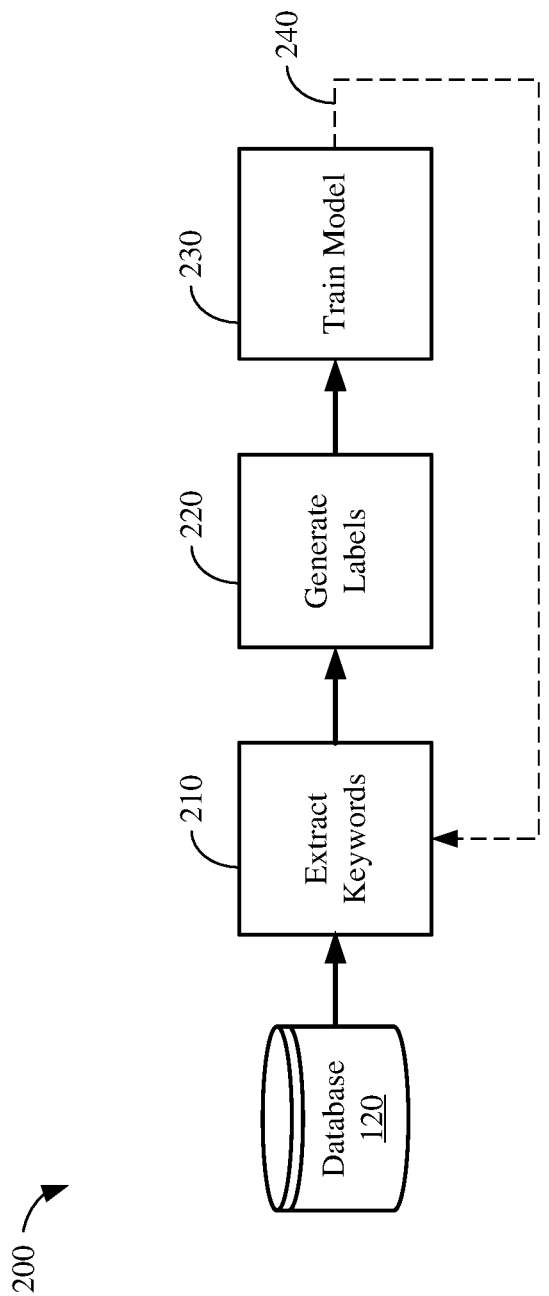
FIG. 2 shows a high-level overview of an example process flow that may be employed by the ML augmented customer support system of FIG. 1.

FIG. 2 shows a high-level overview of an example process flow 200 that may be employed by the ML augmented customer support system 100 of FIG. 1. The example process flow may be a "training" flow during which the machine learning models 160 are trained to generate predictive behavioral QoS scores indicative of various behavioral QoS attributes provided by agents.

At block 210, the feedback extraction engine 140 may retrieve historical conversations between agents and users of the ML augmented customer support system 100, receive user comments for one or more of the historical conversations, and extract one or more keywords indicative of agent behavioral QoS attributes from the historical conversations and user comments. In some implementations, the feedback extraction engine 140 may use a NLP algorithm or a rule-based, key-phrase extractor to identify and extract the keywords based on one or more lists of keywords, such as a dictionary, a lexicon, or a list of key-value pairs, as described in connection with FIG. 1. In some implementations, the keywords may be indicative of one or more behavioral QoS attributes of the agent, such as one or more of a positive professionalism attribute, a negative professionalism attribute, a positive empathy attribute, a negative empathy attribute, a positive communication attribute, or a negative communication attribute.

At block 220, the feedback extraction engine 140 may generate labels for each historical conversation associated with one or more of the extracted keywords. In some implementations, the feedback extraction engine 140 may generate a file (or "labeled transcript") including a plurality of labels, each label associated with one of the keywords from the associated historical conversation. The labeled transcript may be in a JSON format, an XML format, or another suitable file format.

At block 230, the attributes prediction engine 150 may use the labeled transcripts, the user comments, and/or the metadata as input for training the machine learning models 160 to generate predictive behavioral QoS scores indicative of various agent QoS attributes, such as based on unlabeled transcripts, user comments, and/or metadata, as described in connection with FIG. 3. For purposes of training the machine learning models 160, the attributes prediction engine 150 may indicate a desired set of behavioral QoS scores that is to be generated by the trained machine learning models 160 based on a particular labeled transcript, user comments, or metadata associated with a historical conversation. In some implementations, the machine learning models 160 may be trained to generate predictive labels (e.g., desired behavioral QoS scores) for unlabeled transcripts associated with current conversations, current user comments, and/or current metadata, with or without human supervision, as described in connection with FIG. 1.

After training, the process flow 200 may return (240) to block 210 where the "training" flow may repeat using at least one of additional historical conversations, additional user comments, additional metadata, or updated labels. In this manner, the attributes prediction engine 150 may be recursively trained to generate increasingly accurate predictive behavioral QoS scores indicative of various behavioral QoS attributes for agents based on current conversations, user comments, and/or metadata.

Figure 3:
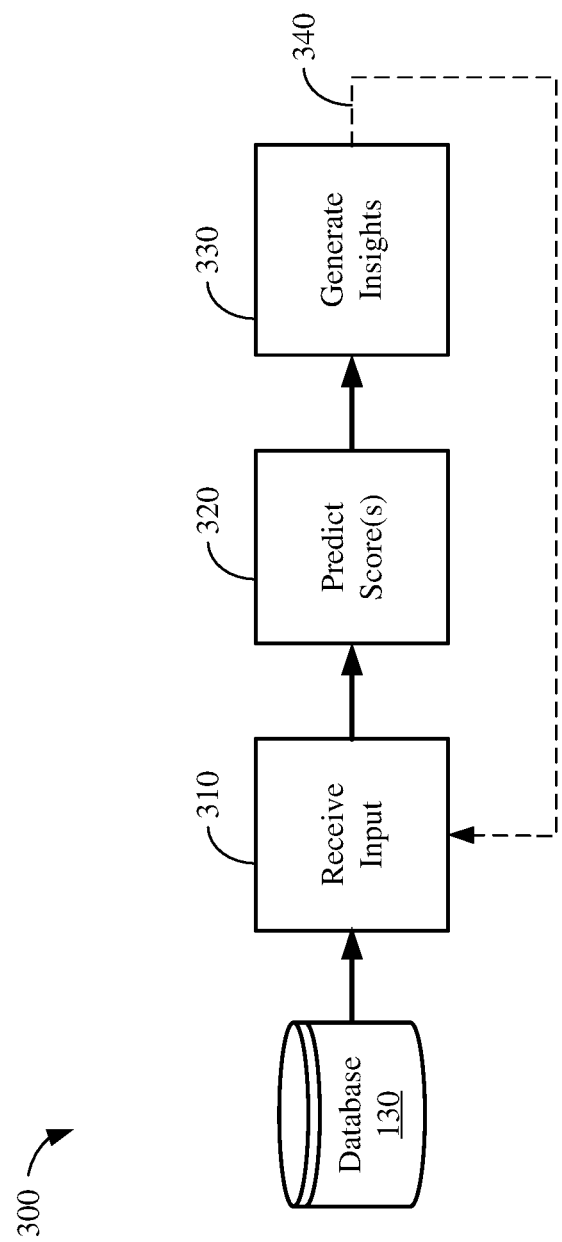
FIG. 3 shows a high-level overview of an example process flow that may be employed by the ML augmented customer support system of FIG. 1.

FIG. 3 shows a high-level overview of an example process flow 300 that may be employed by the ML augmented customer support system 100 of FIG. 1. The example process flow may be an "inference" flow during which the trained machine learning models 160 generate predictive behavioral QoS scores indicative of various behavioral QoS attributes for agents.

At block 310, the attributes prediction engine 150 in conjunction with the trained machine learning models 160 may receive unlabeled transcripts based on current conversations, current user comments, and/or current metadata, and generate predictive behavioral QoS scores indicative of various behavioral QoS attributes of the agents associated with the unlabeled transcripts, as described in connection with FIG. 1.

At block 320, based on one or more of the unlabeled transcripts, the trained machine learning models 160 may generate predictive behavioral QoS scores for each agent associated with the unlabeled transcripts. In some implementations, the attributes prediction engine 150 in conjunction with the machine learning models 160 may output the generated behavioral QoS scores to the interface 110 (not shown for simplicity), which may display the behavioral QoS scores to at least one of a respective agent or a supervisor of the respective agent. Additionally or alternatively, the attributes prediction engine 150 in conjunction with the machine learning models 160 may output the generated behavioral QoS scores to the insights generation engine 170 for further processing.

At block 330, the insights generation engine 170 may generate one or more behavioral QoS reports (or "assessments") for agents based on the behavioral QoS scores. For example, the insights generation engine 170 may generate a behavioral QoS report indicating an individual score for each of a number of different behavioral QoS attributes for a particular agent, such as the agent's professionalism, empathy, and communication attributes. In some implementations, the insights generation engine 170 may output the behavioral QoS reports to the interface 110, which may display the behavioral QoS reports to at least one of a respective agent or a supervisor of the respective agent, as described in connection with FIG. 1.

In some implementations, after generating the insights, the ML augmented customer support system 100 may return (340) to block 310 where the "inference" flow may repeat using at least one of additional current conversations, additional user comments, and/or additional metadata. In some other implementations, the ML augmented customer support system 100 may return (340) to block 310, directly from block 320, without generating insights at block 330, where the "inference" flow may repeat using the additional current conversations, additional user comments, and/or additional metadata. In these manners, the trained attributes prediction engine 150 may continue to generate predictive behavioral QoS scores based on current data and continue to generate insights based on the behavioral QoS scores in real-time.

Figure 4:
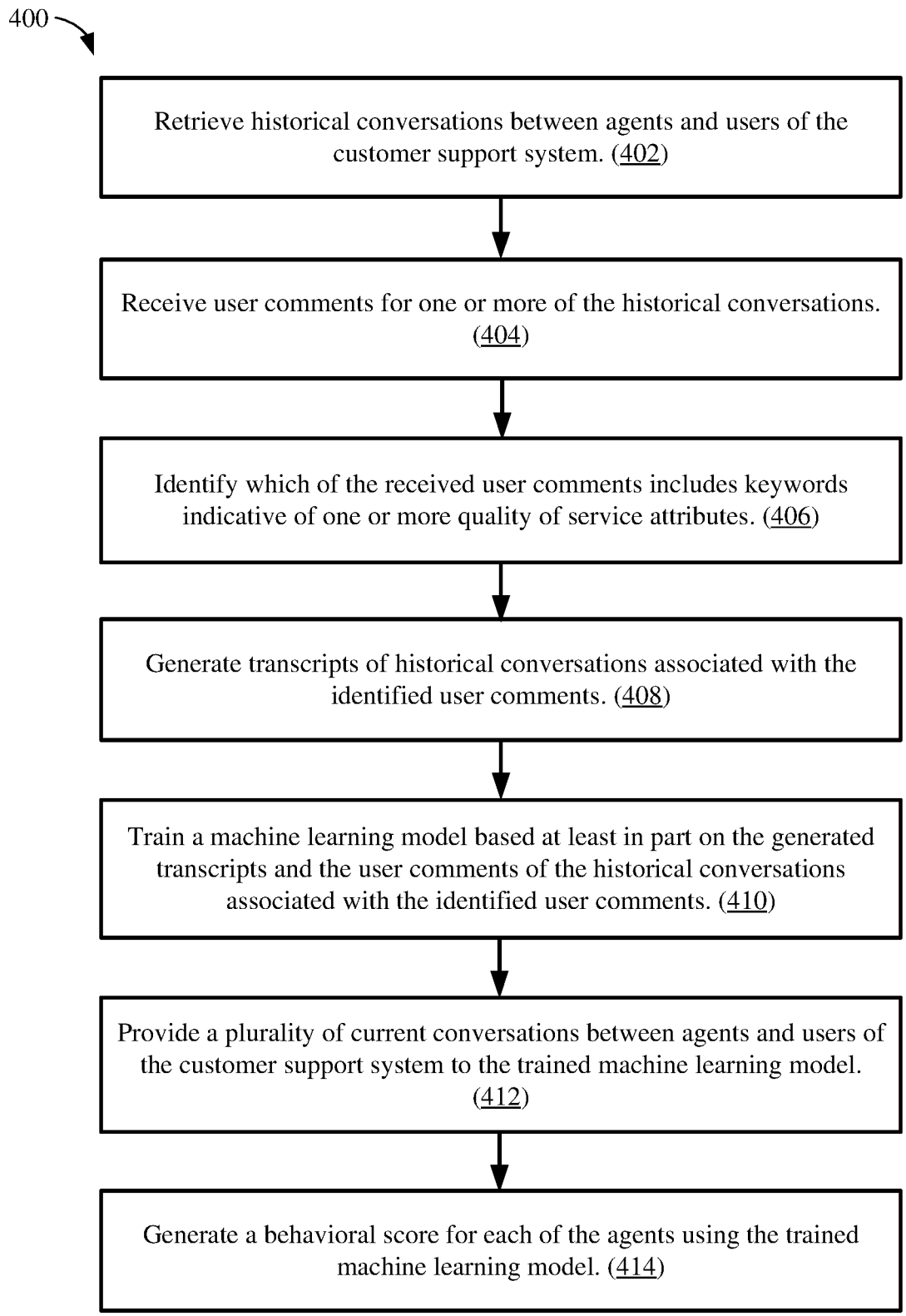
FIG. 4 shows an illustrative flow chart depicting an example operation for automatically assessing a quality of service for agents of a customer support system, according to some implementations.

FIG. 4 shows an illustrative flow chart depicting an example operation 400 for automatically assessing a quality of service for agents of a customer support system, according to some implementations. The example operation 400 may be performed by one or more processors of a computing device associated with the customer support system. In some implementations, the example operation 400 may be performed using the ML augmented customer support system 100 of FIG. 1. It is to be understood that the example operation 400 may be performed by any suitable systems, computers, or servers.

At block 402, the ML augmented customer support system 100 retrieves historical conversations between the agents and users of the customer support system. At block 404, the ML augmented customer support system 100 receives user comments for one or more of the historical conversations. At block 406, the ML augmented customer support system 100 identifies which of the received user comments includes keywords indicative of one or more quality of service attributes. At block 408, the ML augmented customer support system 100 generates transcripts of historical conversations associated with the identified user comments. At block 410, the ML augmented customer support system 100 trains a machine learning model based at least in part on the generated transcripts and the user comments of the historical conversations associated with the identified user comments. At block 412, the ML augmented customer support system 100 provides a plurality of current conversations between agents and users of the customer support system to the trained machine learning model. At block 414, the ML augmented customer support system 100 generates a behavioral QoS score for each of the agents using the trained machine learning model.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for using a machine learning model to predict a quality of service provided by an agent during a conversation with a user of a customer support system, the method performed by one or more processors of the customer support system and comprising:
    retrieving, from a system database, historical data representative of historical conversations between historical agents and historical users of the customer support system;
    receiving user comments associated with one or more of the historical conversations;
    identifying relevant comments among the user comments, each relevant comment including at least one predictive keyword previously identified as indicative of one or more quality of service attributes exhibited by the agent during the historical conversation associated with the relevant comment;
    generating transcripts of the historical conversations associated with the relevant comments based on the historical data;
    training, using the transcripts and the corresponding historical conversations, a machine learning model to generate a behavioral score for an agent based on a transcript of a given conversation between the agent and a user, the behavioral score indicative of a quality of service provided by the agent, as perceived by the user, during the given conversation;
    analyzing, using the trained machine learning model, current transcripts of conversations between current agents and current users of the customer support system, at least some of the current transcripts including ones of the predictive keywords; and
    generating, using the trained machine learning model, a behavioral score for each of the current agents based on the ones of the predictive keywords, each generated behavioral score predictive of a quality of service provided by the current agent, as perceived by the current user, during the conversation.

2. The method of claim 1, wherein the quality of service attributes include one or more of a positive professionalism attribute, a negative professionalism attribute, a positive empathy attribute, a negative empathy attribute, a positive communication attribute, or a negative communication attribute.

3. The method of claim 1, wherein the user comments are received as free-form text.

4. The method of claim 1, wherein:
    one or more of the predictive keywords "walked me through," "navigated me," "made sure I was successful," "helped me understand," "efficiently," "was professional," "was polite," "accommodated," "insight," "was competent," "expert," "was experienced," "timely," "results," "was responsive," or "was knowledgeable," is indicative of a positive professionalism attribute; and
    one or more of the predictive keywords "was not helpful," "unhelpful," "gave up," "got upset," "rude," "could not explain," "was slow," "could not solve," "was unprofessional," "was impolite," "did not accommodate," "was incompetent," or "was inexperienced," is indicative of a negative professionalism attribute.

5. The method of claim 1, wherein:
    one or more of the predictive keywords "was respectful," "was patient," "was genuine," "was caring," "took the time," "paid attention," "asked me," "was willing," "acknowledged," "was attentive," "was generous," "was thoughtful," "listened," "understood," "was pleasant," "was friendly," or "was good natured" is indicative of a positive empathy attribute; and
    one or more of the predictive keywords "was disrespectful," "was impatient," "was insincere," "did not care," "did not take the time," "ignored," "was not willing," "dismissed," "was inattentive," "did not listen," "did not understand," "was unpleasant," or "was unfriendly," is indicative of a negative empathy attribute.

6. The method of claim 1, wherein:
    one or more of the predictive keywords "was easy to follow," "clearly stated," "made sense," "explained," "helped me understand," "directed me," "guided me," "spoke clearly," "pointed me," "clarified," or "answered," is indicative of a positive communication attribute; and
    one or more of the predictive keywords "was confusing," "could not follow," "was not clear," "was unclear," "did not make sense," "failed to explain," "could not explain," or "did not answer," is indicative of a negative communication attribute.

7. The method of claim 1, further comprising:
    extracting the predictive keywords from the relevant comments using one of a natural-language programming (NLP) algorithm or a key-phrase extractor.

8. The method of claim 1, wherein the machine learning model is configured to generate the behavioral score based on metadata associated with the given conversation.

9. The method of claim 8, wherein the metadata indicates at least one of a number of sentences said by the user, a number of sentences said by the agent, a number of words said by the user, a number of words said by the agent, a number of times the agent placed the user on hold, a total amount of time that the user was on hold, a total amount of time that the agent was speaking, a total amount of time that the user was speaking, a total amount of time that the agent was not speaking, a total amount of time that the user was not speaking, a number of times that the user and the agent were speaking simultaneously, or a total amount of time that the user and the agent were speaking simultaneously.

10. The method of claim 1, further comprising:
    providing the generated behavioral score to at least one of the current agent or a supervisor of the current agent.

11. A system for using a machine learning model to predict a quality of service provided by an agent during a conversation with a user of a customer support system, the system comprising:
    one or more processors; and
    a memory storing instructions that, when executed by the one or more processors, causes the system to:
        retrieve, from a system database, historical data representative of historical conversations between historical agents and historical users of the customer support system;
        receive user comments associated with one or more of the historical conversations;
        identify relevant comments among the user comments, each relevant comment including at least one predictive keyword previously identified as indicative of one or more quality of service attributes exhibited by the agent during the historical conversation associated with the relevant comment;

generate transcripts of the historical conversations associated with the relevant comments based on the historical data;

train, using the transcripts and the corresponding historical conversations, a machine learning model to generate a behavioral score for an agent based on a transcript of a given conversation between the agent and a user, the behavioral score indicative of a quality of service provided by the agent, as perceived by the user, during the given conversation;

analyze, using the trained machine learning model, current transcripts of conversations between current agents and current users of the customer support system, at least some of the current transcripts including ones of the predictive keywords; and generate, using the trained machine learning model, a behavioral score for each of the current agents based on the ones of the predictive keywords, each generated behavioral score predictive of a quality of service provided by the current agent, as perceived by the current user, during the conversation.

12. The system of claim 11, wherein the quality of service attributes include one or more of a positive professionalism attribute, a negative professionalism attribute, a positive empathy attribute, a negative empathy attribute, a positive communication attribute, or a negative communication attribute.

13. The system of claim 11, wherein the user comments are received as free-form text.

14. The system of claim 11, wherein:

one or more of the predictive keywords "walked me through," "navigated me," "made sure I was successful," "helped me understand," "efficiently," "was professional," "was polite," "accommodated," "insight," "was competent," "expert," "was experienced," "timely," "results," "was responsive," or "was knowledgeable," is indicative of a positive professionalism attribute; and one or more of the predictive keywords "was not helpful," "unhelpful," "gave up," "got upset," "rude," "could not explain," "was slow," "could not solve," "was unprofessional," "was impolite," "did not accommodate," "was incompetent," or "was inexperienced," is indicative of a negative professionalism attribute.

15. The system of claim 11, wherein:

one or more of the predictive keywords "was respectful," "was patient," "was genuine," "was caring," "took the time," "paid attention," "asked me," "was willing," "acknowledged," "was attentive," "was generous," "was thoughtful," "listened," "understood," "was pleasant," "was friendly," or "was good natured" is indicative of a positive empathy attribute; and one or more of the predictive keywords "was disrespectful," "was impatient," "was insincere," "did not care," "did not take the time," "ignored," "was not willing," "dismissed," "was inattentive," "did not listen," "did not understand," "was unpleasant," or "was unfriendly," is indicative of a negative empathy attribute.

16. The system of claim 11, wherein:

one or more of the predictive keywords "was easy to follow," "clearly stated," "made sense," "explained," "helped me understand," "directed me," "guided me," "spoke clearly," "pointed me," "clarified," or "answered," is indicative of a positive communication attribute; and one or more of the predictive keywords "was confusing," "could not follow," "was not clear," "was unclear," "did not make sense," "failed to explain," "could not explain," or "did not answer," is indicative of a negative communication attribute.

17. The system of claim 11, wherein execution of the instructions further causes the system to:

extract the predictive keywords from the relevant comments using one of a natural-language programming (NLP) algorithm or a key-phrase extractor.

18. The system of claim 11, wherein the machine learning model is configured to generate the behavioral score based on metadata associated with the given conversation.

19. The system of claim 18, wherein the metadata indicates at least one of a number of sentences said by the user, a number of sentences said by the agent, a number of words said by the user, a number of words said by the agent, a number of times the agent placed the user on hold, a total amount of time that the user was on hold, a total amount of time that the agent was speaking, a total amount of time that the user was speaking, a total amount of time that the agent was not speaking, a total amount of time that the user was not speaking, a number of times that the user and the agent were speaking simultaneously, or a total amount of time that the user and the agent were speaking simultaneously.

20. The system of claim 11, wherein execution of the instructions further causes the system to:

provide the generated behavioral score to at least one of the current agent or a supervisor of the current agent.

* * * * *